United States Patent
Ito et al.

(10) Patent No.: US 6,757,390 B2
(45) Date of Patent: Jun. 29, 2004

(54) WRISTWATCH TYPE WIRELESS TELEPHONE

(75) Inventors: Takashi Ito, Chiba (JP); Yoshinori Bito, Chiba (JP); Kouichi Noguchi, Chiba (JP); Katsunobu Iguchi, Chiba (JP)

(73) Assignee: Seiko Instruments Inc., Chiba (JP)

( * ) Notice: Subject to any disclaimer, the term of this patent is extended or adjusted under 35 U.S.C. 154(b) by 421 days.

(21) Appl. No.: 09/814,516

(22) Filed: Mar. 22, 2001

(65) Prior Publication Data

US 2001/0036264 A1 Nov. 1, 2001

(30) Foreign Application Priority Data

Mar. 28, 2000 (JP) .................................. 2000-089449
Dec. 28, 2000 (JP) .................................. 2000-400161

(51) Int. Cl.[7] .................................................. H04M 1/00
(52) U.S. Cl. .............................. 379/433.1; 379/433.02; 379/433.03
(58) Field of Search .................. 379/433.1, 433.02, 379/433.03, 451, 355.06–355.09; 455/344, 350, 317, 456.6–457; 381/189, 391, 361–364

(56) References Cited

U.S. PATENT DOCUMENTS

| 4,225,970 | A | * | 9/1980 | Jaramillo et al. | 455/89 |
| 5,008,864 | A | | 4/1991 | Yoshitake | 368/10 |
| 5,235,560 | A | | 8/1993 | Seager | 368/10 |
| 5,260,915 | A | * | 11/1993 | Houlihan | 368/10 |
| 5,274,613 | A | | 12/1993 | Seager | 368/13 |
| 6,529,713 | B1 | * | 3/2003 | Seymour | 455/90 |

* cited by examiner

*Primary Examiner*—Jack Chiang
*Assistant Examiner*—Marie C. Ubiles
(74) *Attorney, Agent, or Firm*—Adams & Wilks

(57) ABSTRACT

To provide a wristwatch type wireless telephone improved in terms of handling in that there is no need to change the holding state of the wristwatch type wireless telephone when the wristwatch type wireless telephone is used for telephone conversation by being removed from an arm and held in a hand. In a wristwatch type wireless telephone carried by being worn on an arm by binding with an arm band, a sound radiating hole of a mouthpiece and a sound receiving hole of an ear piece are formed in a surface at a back surface, at the arm side in a state of being worn on an arm.

30 Claims, 7 Drawing Sheets

A-A

WRISTWATCH TYPE WIRELESS TELEPHONE

BACKGROUND OF THE INVENTION

1. Field of the Invention

This invention relates to a wristwatch type wireless telephone, and more particularly, to a wristwatch type wireless telephone having a wireless telephone function such as that of the PHS (Personal Handyphone System).

2. Description of the Prior Art

Wireless telephones such as the PHS include a wristwatch type wireless telephone having a wristwatch-like shape and having its arm band equivalent to a wristwatch band fitted about an arm of a user when worn (Japanese Patent Application Laid-Open Publication Nos. Hei. 2-257739 and Hei 11-177663). In the conventional wristwatch type wireless telephone, each of a display portion, operating buttons, a sound radiating hole of a mouthpiece through which a user's voice is radiated, and a sound receiving hole of an earpiece through which received sound information is outputs is formed in a front side opposite the arm side when the wireless telephone is worn on an arm, so that the wireless telephone can be used for telephone conversation even while being worn on the arm.

The conventional wristwatch type wireless telephone can be used for telephone conversation in a state of being worn about an arm, since each of its display portion, its operating buttons, the sound radiating hole of its mouthpiece, and the sound receiving hole of its earpiece is formed in the front surface opposite the arm side when the device is worn on the arm. However, when the wireless telephone is worn on one's arm, it is difficult to keep the wireless telephone positioned to maintain the sound radiating hole of the mouthpiece in the vicinity of the mouth and the sound receiving hole of the earpiece in the vicinity of the ear. In some situations, therefore, it is preferable to remove the wristwatch type wireless telephone from the arm and to hold the wristwatch type wireless telephone in the hand during telephone conversation.

However, when the conventional wristwatch type wireless telephone is removed from the arm, the front surface side thereof faces the palm side of the hand and a need arises to temporarily shift the wristwatch type wireless telephone as from the right hand to the left hand, or to turn wristwatch type wireless telephone in the palm in order that the sound radiating hole of the mouthpiece and the sound receiving hole of the earpiece may correspond to (face) the vicinity of the mouth and the vicinity of the ear, since the conventional wristwatch type wireless telephone has each of its display portion, operating buttons, the sound radiating hole of its mouthpiece, and the sound receiving hole of its earpiece formed in the front surface opposite the arm side, thus making the operation troublesome. In particular, shifting the wireless telephone from one hand to the other cannot be done with one hand, and is inconvenient in a situation where only one hand can be used while the other hand is holding something, such as a brief case.

In addition, a waterproofing film made from a porous fluoride resin etc. is stuck over the sound receiving hole and the sound radiating hole with a need to protect those holes from the infiltration of a drop of water while securing its breathability. This waterproofing film is usually protected by a protective sheet made of metal or resin in a mesh-like or a fiber-like state. However, in electronic equipment used for a mobile use such as wireless telephone, the protective sheet, the sound radiating hole, or the sound receiving hole is clogged with dust or dirt of a hand during the use of the equipment. Therefore, there is a problem in that the transmission of a sound is hindered. In these cases, we often come across such a scene that the general consumers remove the dust or dirt of a hand by using a peg such as a toothpick. However, the insertion of such a peg may damage the protective film.

SUMMARY OF THE INVENTION

The present invention has been made to solve the problems described above, and therefore has a primary object to provide a wristwatch type wireless telephone improved in terms of handling so that there is no need to change the holding state of the wristwatch type wireless telephone when the wristwatch type wireless telephone is removed from the arm and used for telephone conversation by being held in a hand. Further, a secondary object of the invention is to provide a wristwatch type wireless telephone in which sound holes such as a sound radiating hole and a sound receiving hole are hardly clogged with dust or dirt of a hand, and in addition, a third object of the invention is to provide a wristwatch type wireless telephone in which a waterproofing film is hardly damaged.

To achieve the above-described objects, according to the present invention, there is provided a wristwatch type wireless telephone carried by being detachably worn on an arm by binding with an arm band, and having a sound radiating hole of a mouthpiece and a sound receiving hole of an earpiece formed in a surface to be a back surface corresponding to an arm side in a worn-on-arm state.

In this arrangement, when the wristwatch type wireless telephone is removed by one hand from the arm, it can be held in the same hand without being shifted from the held position, and the sound radiating hole of the mouthpiece and the sound receiving hole of the earpiece are thereby positioned on the side opposite from the palm of the hand, so that the sound radiating hole of the mouthpiece and the sound receiving holes of the earpiece correspond to (face) the vicinity of the mouth and the vicinity of the ear, thereby enabling telephone conversation.

Further, in the wristwatch type wireless telephone in accordance with this invention, a display portion and operating buttons are formed in a surface to be a front side opposite from the arm side in a worn-on-arm state.

Still further, in the wristwatch type wireless telephone in accordance with this invention, a holder portion for detachably holding a body of the wristwatch type wireless telephone is formed in the arm band, the sound radiating hole of the mouthpiece and the sound receiving hole of the earpiece are formed in a back surface side of the body, and the body can be attached to and detached from the arm band by a one-handed operation.

Yet further, in the wristwatch type wireless telephone in accordance with this invention, the body of the wristwatch type wireless telephone has a flexible structure portion at the intermediate portion, and the shape of the body may be deformed between a curved bent shape and a flat shape by the flexible operation of the flexible structure portion.

Moreover, in the wristwatch type wireless telephone in accordance with another aspect of this invention, the sound radiating hole of the mouthpiece and the sound receiving hole of the earpiece are formed in the arm band at the back surface side of the same.

Further, in the wristwatch type wireless telephone according to the present invention, the hole boring direction of the sound holes provided to the wristwatch type wireless telephone body and the vertical direction with respect to the face of the waterproofing sheet for preventing the sound devices from the water, which are provided inside the wristwatch type wireless telephone body have such a relationship that they are substantially at right angles at a part or at a whole part thereof. As a result, the sound holes are positioned other than the portion on the arm side of the body. For this reason, the sound holes are hardly clogged with dust and dirt of a hand.

Further, even if the peg enters from the sound hole side, it does not abut against the waterproofing sheet, thereby being capable of preventing the waterproofing sheet from being broken. In the sound holes, from a short hole of a thin portion to a long hole of a thicker portion are included therein. However, particularly, by enlarging the length of the sound hole, it can further prevent the peg from reaching the waterproofing sheet. Note that, in the sound holes described above, not only the sound radiation hole of the mouthpiece and the sound receiving hole of the earpiece, but also various holes for alarms are included therein. In addition, a sound radiating device and the sound receiving device are included in the sound device. For example, the speakers and microphones etc. re enumerated as the sound radiation device and the sound receiving device, respectively. Besides, by providing the waterproofing sheet for preventing the sound device from being exposed to water, and by providing the sound holes to the wristwatch type wireless telephone body or to the side face of the arm band, a similar functional effect to that described above may be obtained.

Further, in the wristwatch type wireless telephone according to the present invention, an obstructing member is provided between the sound hole and a waterproofing sheet, which are provided to the wristwatch type wireless telephone body. As a result, even if the peg enters through the sound holes, the insertion of the peg is regulated at a position to some extent with the obstructing member. With this, the peg can be prevented from reaching the waterproofing sheet, with the result that breakage of the waterproofing sheet can be prevented.

Further, in the wristwatch type wireless telephone according to the present invention, a second sound hole is provided in the front side of the wristwatch type telephone body, and the second sound hole and the waterproofing sheet for protecting the sound devices from water are arranged with their positions shifted in a plane direction. As a result, even if the peg enters from the second sound hole, it does not abut against the waterproofing sheet. For this reason, breakage of the waterproofing sheet can be prevented. In addition, provision of the second sound hole enables the volume of the sound to be large, and if necessary, it enables sending or receiving conversation from the front side of the body.

BRIEF DESICRIPTION OF THE DRAWINGS

A preferred form of the present invention is illustrated in the accompanying drawings in which.

Figure 8:
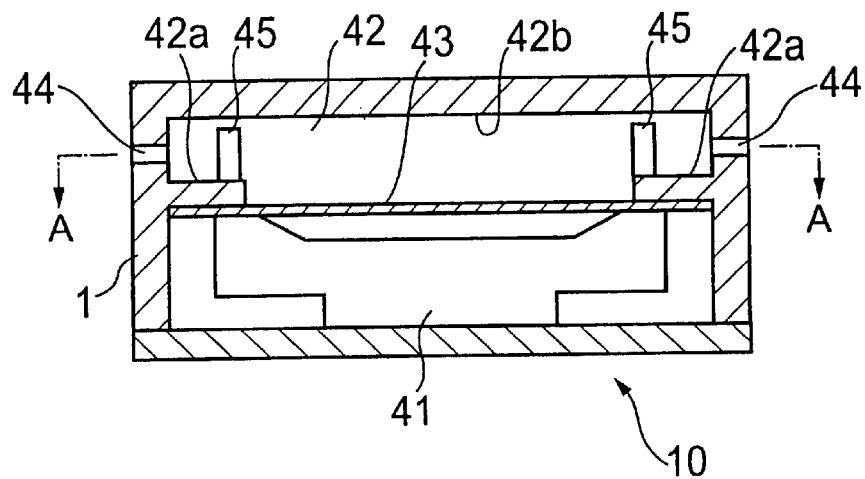
Figure 9:
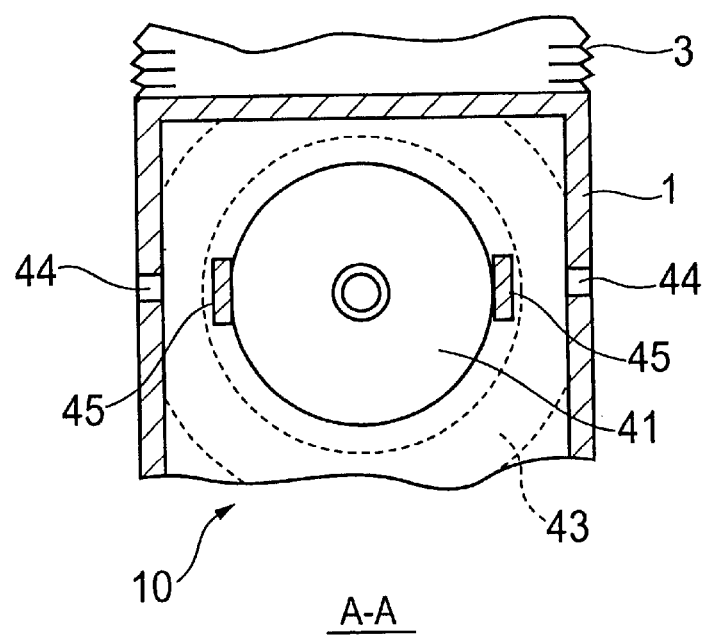
Figure 10:
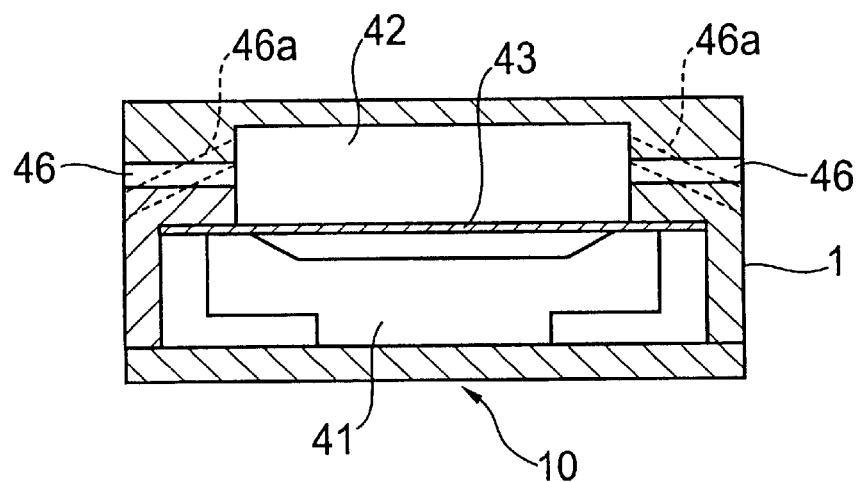
Figure 11:
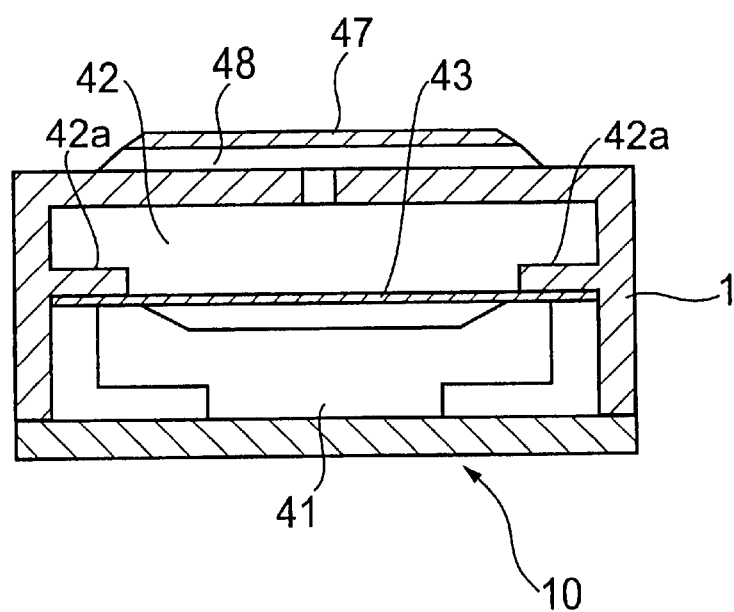
Figure 12:
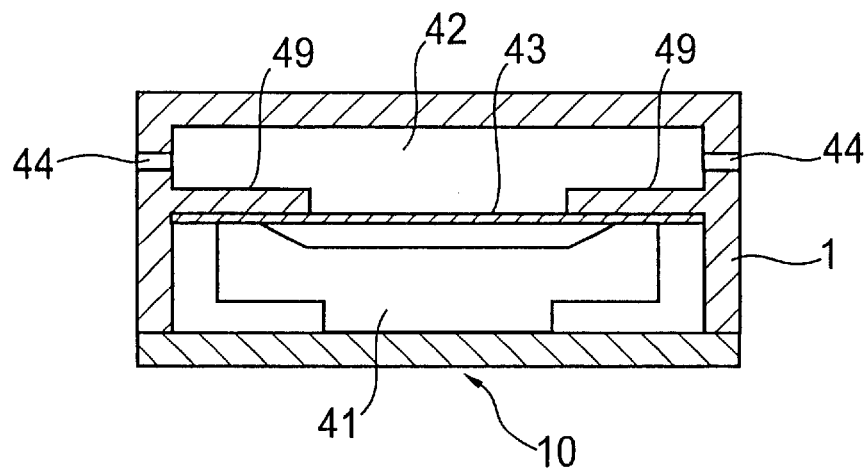
Figure 13:
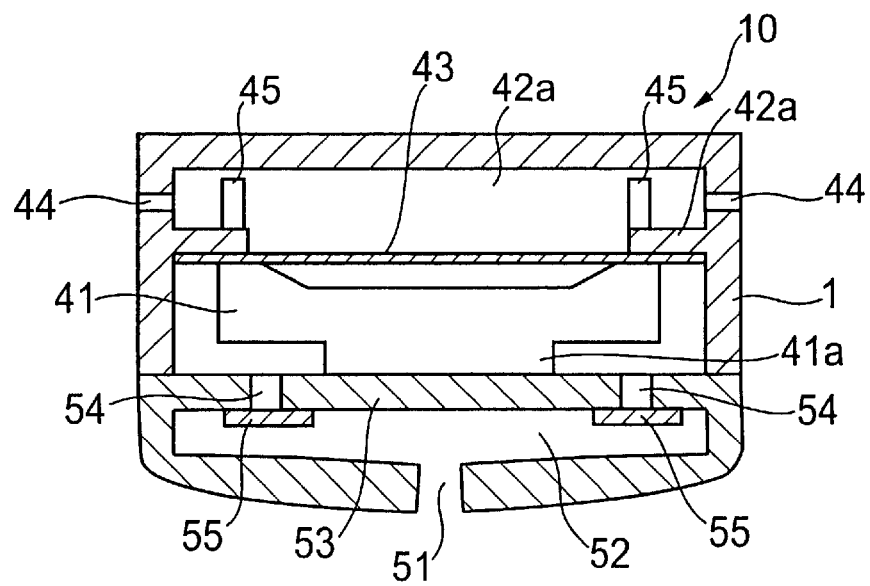

FIG. 8 ia a cross-sectional view of Embodiment 4 of the wristwatch type wireless telephone in accordance with this invention;

FIG. 9 is a cross-sectional view taken along the line A—A of FIG. 8;

FIG. 10 is a cross-sectional view of a modified example of the wristwatch type wireless telephone shown in FIG. 8;

FIG. 11 is a cross-sectional view of a modified example of the wristwatch type wireless telephone shown in FIG. 8;

FIG. 12 is a cross-sectional view of a modified example of the wristwatch type wireless telephone shown in FIG. 8; and FIG. 13 is a cross-sectional view of Embodiment 5 of the wristwatch type wireless telephone in accordance with this invention.

DETAILED DESCRIPTION OF THE PREFERRED EMBODIMENTS

Embodiments of the wristwatch type wireless telephone in this invention will be described below in detail with reference to the accompanying drawings.

(Embodiment 1)

Figure 1:
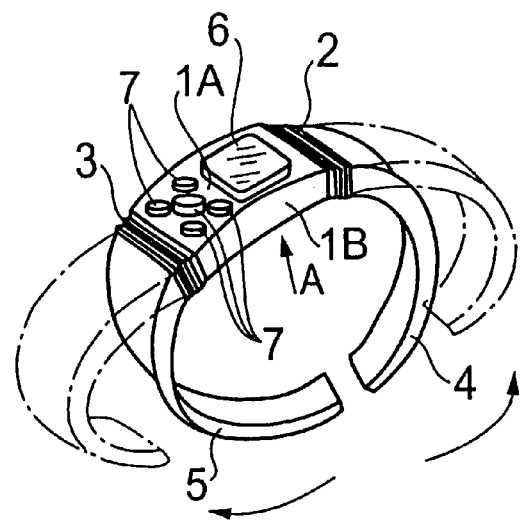
FIG. 1 is a perspective view of Embodiment 1 of a wristwatch type wireless telephone in accordance with this invention.
Figure 2:
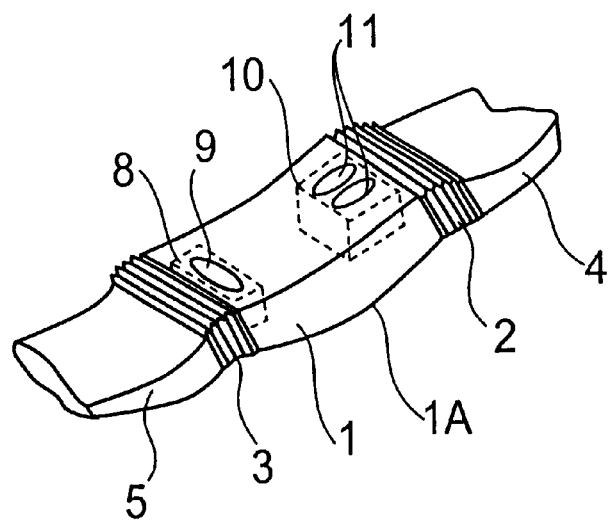
FIG. 2 is a perspective view in the direction of arrow A in FIG. 1.

FIGS. 1 and 2 show Embodiment 1 of the wristwatch type wireless telephone in accordance with this invention. This wristwatch type wireless telephone has a wireless telephone body 1. Arm band half members 4 and 5 that are substantially C-shaped and may be opened and closed are connected to opposite sides of the wireless telephone body 1 by hinge structure portions 2 and 3. The wireless telephone is detachably worn on an arm of a user by binding with the arm band half members 4 and 5.

The wireless telephone body 1 has a surface 1A to be the front surface opposite from the arm side in the state of being worn on the arm by binding with the arm band half members 4 and 5, in which a display portion 6 formed by a liquid crystal display panel having status indications necessary for the wireless telephone and capable of displaying information, time, etc., and operating buttons 7 for inputting data necessary for the wireless telephone and for performing selection, setting, etc. are provided.

Also, in the wireless telephone body 1, a surface 1B to be the back surface, i.e., the arm side in the sate of being worn on the arm by binding with the arm band half members 4 and 5, a sound radiating hole 9 of a mouthpiece 8 and sound receiving holes 11 of an earpiece 10 for a wireless telephone are formed. The sound radiating hole 9 and the sound receiving holes 11 are formed apart from each other so as to correspond to the vicinity of the ear and the vicinity of the mouth, respectively, for telephone conversation by a wireless telephone. In this embodiment, the sound radiating hole 9 is formed close to one hinge structure portion 3 while the sound receiving holes 11 are formed close to the other hinge structure portion 2 opposite form the hinge structure portion 3.

The wristwatch type wireless telephone constructed as described above is detachably worn on one arm, e.g., the left arm of a user by binding with the arm band half members 4 and 5.

When the wireless telephone is used, the user operates the operating buttons 7 to perform dialing and call processing while watching indications on the display portion 6 in the worn-on-arm state. Thereafter, the user holds the wireless telephone body 1 in the right hand and removes the wristwatch type wireless telephone from the arm, by opening the arm band half members 4 and 5. When the wireless telephone body 1 is held in the right hand, the display portion 6 and the operating buttons 7 are positioned on the right hand palm side while the sound radiating hole 9 of the mouthpiece 8 and the sound receiving holes 11 of the earpiece 10 are positioned on the side opposite from the right hand palm.

Therefore, while the wristwatch type wireless telephone is being held in the hand used to remove the wireless telephone body 1 from the arm, i.e., the right hand, without being shifted from the held position, and while the sound radiating hole 9 of the mouthpiece 8 and the sound receiving holes 11 of the earpiece 10 are being positioned on the side opposite from the palm of the hand, in such state the entire wristwatch type wireless telephone is brought close to the cheek, so that the sound radiating hole 9 of the mouthpiece 8 and the sound receiving holes 11 of the earpiece 10 correspond to (face) the vicinity of the mouth and the vicinity of the ear, thus enabling telephone conversation by a one-hand operation.

Note that, in the above-described telephone conversation state, the arm band half members 4 and 5 are largely opened by the hinge structure portions 2 and 3, as shown in FIG. 2, thereby avoiding being encumbered with the arm band half members 4 and 5 during telephone conversation.

(Embodiment 2)

Figure 3:
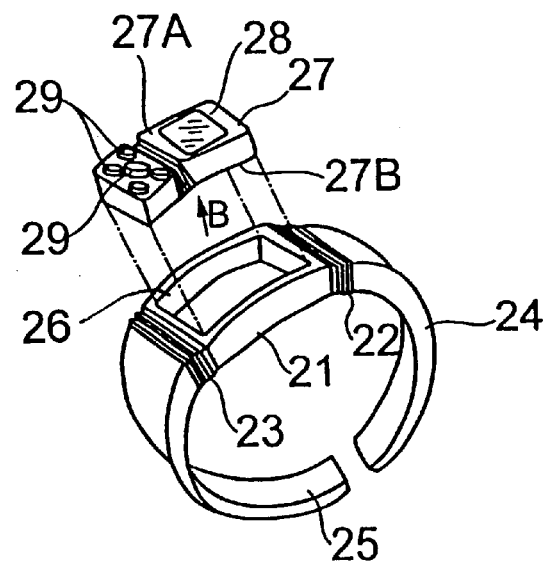
FIG. 3 is a perspective view of Embodiment 2 of the wristwatch type wireless telephone in accordance with this invention.
Figure 4:
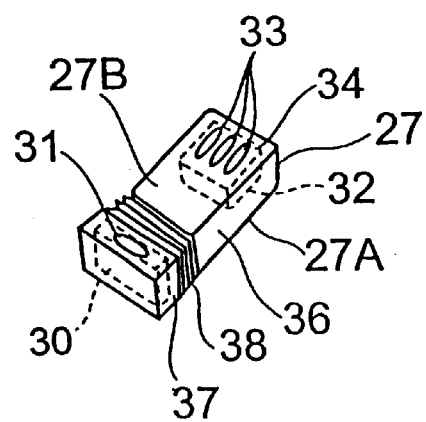
FIG. 4 is a perspective view in the direction of arrow B in FIG. 3.
Figure 5:
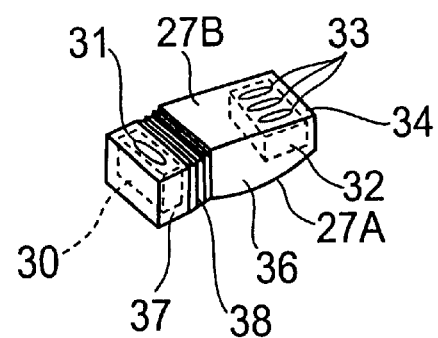
FIG. 5 is a perspective view in the direction of arrow B in FIG. 3, showing a state where the wireless telephone body is in a flat shape.

FIGS. 3 through 5 show Embodiment 2 of the wristwatch type wireless telephone in accordance with this invention. This wristwatch type wireless telephone has a wireless telephone body holder portion 21, and arm band half members 24 and 25 that are substantially C-shaped and may be opened and closed are connected to opposite sides of the wireless telephone body holder portion 21 by hinge structure portions 22 and 23.

A holder recess portion 26 is formed in the wireless telephone body holder portion 21, and a wireless telephone body 27 is detachably fitted in the holder recess portion 26. That is, the wireless telephone body 27 is detachably held in the holder recess portion 26 and together with the wireless telephone body holder portion 21 is detachably worn on an arm of a user by binding with the arm band half members 24 and 25.

In the wireless telephone body 27, a surface (outer surface) 27A to be the front side opposite from the arm side in the state of being worn on the arm by being fitted in the holder recess portion 26 of the wireless telephone body holder portion 21 and by binding with the arm band half members 24 and 25, are provided with a display portion 28 formed by a liquid crystal display panel having status indications necessary for the wireless telephone and capable of displaying information, time, etc., and operating buttons 29 for inputting data necessary for the wireless telephone and for performing selection, setting, etc.

Also, in the wireless telephone body 27, a surface 27B (a bottom surface facing a bottom surface of the holder recess portion 26) to be the back side, on the arm side in the above-described state of being worn on the arm by binding with the arm band half members 24 and 25, a sound radiating hole 31 of a mouthpiece 30 and sound receiving holes 33 of an earpiece 32 for a wireless telephone are formed. Also in this case, the sound radiating hole 31 and the sound receiving holes 33 are formed apart from each other so as to correspond to the vicinity of the mouth and the vicinity of the ear, respectively for telephone conversation by a wireless telephone.

A switch hole is formed in the surface 27B of the wireless telephone body 27. When the wireless telephone body 27 is fitted in the holder recess portion 26 of the wireless telephone body holder portion 21, a projection formed in the holder recess portion 26 is fitted in the switch hole, to thereby automatically effect a change from the communication state to a communication-terminated state.

In the wireless telephone body 27, a portion 36 in which the display portion 28 and the sound receiving holes 33 of the earpiece 32 are provided, and a portion 37 in which the operating buttons 29 and the sound radiating hole 31 of the mouthpiece 30 are provided, are formed separately from each other. The portions 36 and 37 are connected by a flexible structure portion 38 at the intermediate portion and can be moved by the flexing operation of the flexible structure portion 38, so it may be deformed between a curved bent shape such as that shown in FIG. 4 and a flat shape such as shown in FIG. 5.

In the wristwatch type wireless telephone constructed as described above, the wireless telephone body 27 is fitted in the holder recess portion 26 of the wireless telephone body holder portion 21, and detachably worn on one arm of a user, e.g., the left arm by binding with the arm band half members 24 and 25.

When the wireless telephone is used, the user operates the operating buttons 29 to perform dialing and call processing while watching indications on the display portion 28, in the above-described worn-on-arm state. Thereafter, the user takes the wireless telephone body 27 with the right hand and pulls out the wireless telephone body 27 from the holder recess portion 26. In the state where the wireless telephone body 27 is taken with the right hand and pulled out from the holder recess portion 26, the display portion 28 and the operating buttons 29 are positioned on the right hand palm side, while the sound radiating hole 31 of the mouthpiece 30 and the sound receiving holes 33 of the earpiece 32 are positioned on the side opposite from the right hand palm.

Therefore, while the wristwatch type wireless telephone body 27 is being held in the hand used to pull it out from the holder recess portion 26 of the wireless telephone body holder portion 21, i.e., the right hand, without being shifted from the holding position, and while the sound radiating hole 31 of the mouthpiece 30 and the sound receiving holes 33 of the earpiece 32 are being positioned on the side opposite from the palm of the hand, the wireless telephone body 27 is brought close to the cheek, so that the sound radiating hole 31 of the mouthpiece 30 and the sound receiving holes 33 of the earpiece 32 correspond to (face) the vicinity of the mouth and the vicinity of the ear, thus enabling telephone conversation by a one-hand operation.

After the completion of telephone conversation, the wireless telephone body 27 is fitted in the holder recess portion 26 of the wireless telephone body holder portion 21 to be returned to the original worn state. When the wireless telephone body 27 is returned to the original worn state, the projection formed in the holder recess portion 26 is fitted in the switch hole, to thereby automatically effect a change from the communication state to the communication-terminated state.

Note that, the wireless telephone body 27 can be carried alone, in a removed state from the wireless telephone body holder portion 21. The wireless telephone body holder portion 21 is curved such as to be fitted to the arm shape, and the holder recess portion 26 is also curved correspondingly. Accordingly, the wireless telephone body 27 has a curved bent shape such as shown in FIG. 4 when fitted in the holder recess portion 26. However, when carried alone, the wireless telephone body 27 can have a flat shape such as shown in FIG. 5 by virtue of the flexible operation of the flexible structure portion 38, so that it can be put in a pocket of a garment or the like without being bulky.

With this, both the fitting of the wireless telephone body 27 to the arm band and the compactness of the wireless telephone body 27 when it is carried alone can be held compatibly.

Besides, under a state where the wireless telephone body 27 is fitted in the holder recess portion 26 of the wireless telephone body holder portion 21, it is possible for the fitting portions of the wireless telephone body 27 and the holder recess portion 26 to have a sealing effect such that the side of the surface 27B of the wireless telephone body 27 is waterproofed, thereby protecting the sound radiating hole 31 of the mouthpiece 30 and the sound receiving holes 33 of the earpiece 32 from being permeated with liquid droplets.

Note that, attachment or detachment of the wireless telephone body 27 to or from the holder recess portion 26 may be based on a sliding method, a turning method, or the like. Any method may suffice as long as prevention of coming-off and attachment/detachment in a single-motion are achieved. It is also possible for the wireless telephone body holder portion 21 to incorporate a click-stop mechanism, a spring type pop-up mechanism, a button-operated spring eject mechanism, or the like.

In each of the above-described embodiments, the display portion 6 or 28, and the operating buttons 7 or 29 may be formed in the surface in which the sound radiating hole 9 or 31 of the mouthpiece 8 or 30 and the sound receiving holes 11 or 33 of the earpiece 10 or 32 are formed, instead of being formed in the front surface side, or may be formed in both surfaces.

(Embodiment 3)

Figure 6:
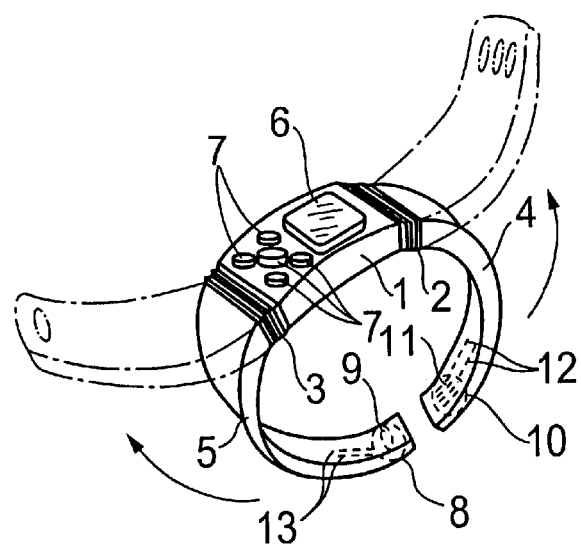
FIG. 6 is a perspective view of Embodiment 3 of the wristwatch type wireless telephone in accordance with this invention.

FIG. 6 shows Embodiment 3 of the wristwatch type wireless telephone in accordance with this invention. Further, in FIG. 6, portions corresponding to those in FIG. 1 are indicated by the same reference numerals. The description for the corresponding portions will be omitted.

In this embodiment, arm band half members 4 and 5 have a flexible structure such that they may be reversed, as indicated by the imaginary line in FIG. 6. A mouthpiece 8 is embedded in a tip end portion of one arm band half member 5, and its sound radiating hole 9 is opened in the back surface side of the arm band half member 5. An earpiece 10 is embedded in a tip end portion of the other arm band half member 4, and a sound receiving hole 11 is opened in the back surface side.

The mouthpiece 8 and the earpiece 10 are electrically connected to a control circuit or the like (not shown in the figure) provided in the wireless telephone body 1 by internal wirings 12 and 13 embedded in the arm band half members 4 and 5.

Figure 7:
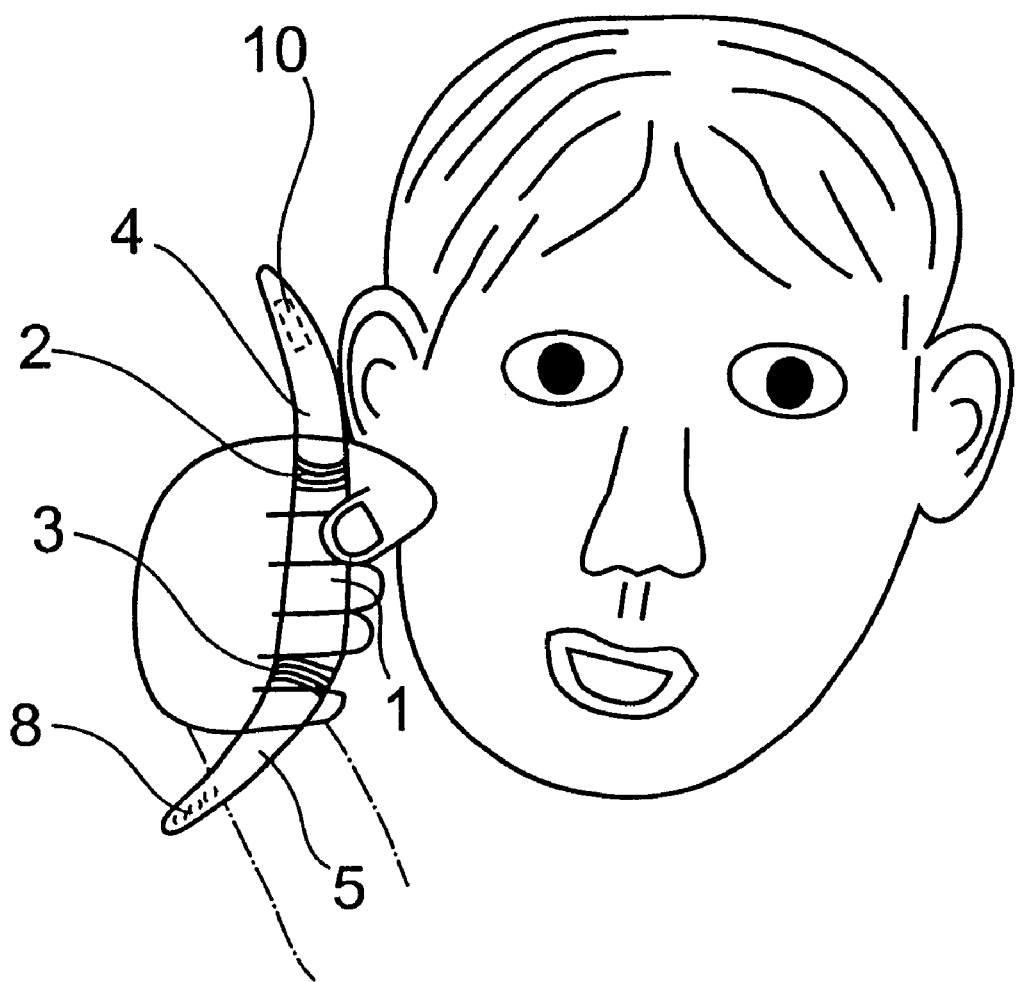
FIG. 7 is a diagram illustrating an example of use of the wristwatch type wireless telephone according to Embodiment 3.

Also in this embodiment, when the wireless telephone is used, a user operates the operating buttons 7 to perform dialing and call processing, while watching indications of the display portion 6, in the worn-on-arm state. Thereafter, the user holds the wireless telephone body 1 in the right hand, removes the wristwatch type wireless telephone from the arm by opening the arm band half members 4 and 5, and reversing the arm band half members 4 and 5. In this state of the wireless telephone body 1 being held in the right hand, the display portion 6 and the operating buttons 7 are positioned on the right hand palm side, while the sound radiating hole 9 of the mouthpiece 8 and the sound receiving holes 11 of the earpiece 10 are positioned on the side opposite from the right hand palm as shown in FIG. 7.

Therefore, while the wristwatch type wireless telephone is being held in the hand used to remove the wireless telephone body 1 from the arm, i.e., the right hand, without being shifted from the holding position, and while the sound radiating hole 9 of the mouthpiece 8 and the sound receiving holes 11 of the earpiece 10 are being positioned on the side opposite from the palm of the hand, in such state the entire wristwatch type wireless telephone is brought close to the cheek, so that the sound radiating hole 9 of the mouthpiece 8 and the sound receiving holes 11 of the earpiece 10 correspond to (face) the vicinity of the mouth and the vicinity of the ear, thus enabling telephone conversation by a one-hand operation. Moreover, the sound radiating hole 9 of the mouthpiece 8 is located at the tip end of the arm band half member 5, and the sound receiving holes 11 of the earpiece 10 are located at the tip end of the other arm band half member 4, that is, the two groups of holes are distanced from each other, the sound radiating hole 9 of the mouthpiece 8 being positioned in the vicinity of the mouth, the sound receiving holes 11 of the earpiece 10 being easily positioned in a natural position in the vicinity of the ear, thus, the user can easily perform a telephone conversation.

(Embodiment 4)

FIGS. 8 and 9 show Embodiment 4 of the wristwatch type wireless telephone in accordance with this invention. The wristwatch type wireless telephone according to this embodiment has a characteristic in a waterproofing structure of the sound radiating hole portion and the sound receiving hole portion described in Embodiments 1 to 3. This wristwatch type wireless telephone has a structure in which a speaker 41 of the earpiece 10 is provided into the wireless telephone body 1 having a flat shape, and a resonance room 42 is formed in front of the speaker. Between the speaker 41 and the resonance room 42 is partitioned by a lip 42a, and a waterproofing film 43 is provided to the opening thereof.

As the waterproofing film 43, existing materials having a moisture permeability, for example, MICROTECH, GORETEX, MICROWEATHER (Trademarks in each case), or the like, are preferably used. In particular, usually, these waterproofing film 43 are widely used for rain wear, ski wear, and the like, and have a merit in not only having a waterproofing function, but also have a function to radiate water moisture within the body to the outside, as well as a high strength. A known speaker such as a dynamic speaker or PZT may be used for the speaker 41. The speaker and the microphone of the mouthpiece are also referred to herein as sound converting devices.

Besides, provided both sides of the wireless telephone body 1 are the resonance room 42 and sound radiation holes 44 communicating with outside. The hole boring direction of the sound radiation holes 44 and the vertical direction with respect to the face of the waterproofing film 43 have such a relationship that they are substantially right angled. Further, the shape of the sound radiation holes 44 may have a circle or a rectangular shape, and is set as a dimension which can prevent dust from clogging. Specifically, the diameter of the sound radiation hole is preferably set to 2 mm or more. Further, it is needless to say that the hole forming positions and the number of bored holes may appropriately be changed from a view of the sound radiating effect. In addition, in order for the sound radiating holes 44 themselves to have a waterproofing effect to some extent, the dimension of the hole may be set so that the water hardly invades the inside due to the surface tension of water. Note that the sound radiating hole may be provided not only both sides of the wireless telephone body 1, but also to only one side or an upper side surface of the body (not shown). Also, an obstacle body 45 having a projecting plate-like shape is provided in the vicinity of the sound radiating holes 44, for preventing a bar-like or a needle-like peg from entering. Note that the shape of the obstacle body 45 is not limited to a projecting plate-like shape, but may be a semi-spherical or quadrangle column-like projection.

By such a structure, a waterproofing structure may be provided to the wristwatch type wireless telephone, as well as preventing dust or dirt or the user's hand from entering the sound radiating holes 44, because the sound radiating holes 44 are provided on both sides. Therefore, muffling of sound it can be prevented due to clogging of the sound radiating holes 44 with dust, etc. Further, the waterproofing film 43 is provided so as to face with internal wall faces 42b of the resonance room 42, and therefore, even if a peg-like structure from outside enters the sound hole, it does not reach the waterproofing film 43, thereby being capable of preventing the waterproofing film 43 from being damaged. For this reason, even if the sound radiating holes 44 are clogged with dust, they can be cleaned by a peg such as a toothpick. In addition, the waterproofing film 43 does not abut against the arm directly, and therefore, stains do not adhere thereonto. A mesh-like protective member is not needed to be provided in the front face of the waterproofing film, and therefore water is not accumulated in the mesh, with the result that it does not cause an obstruction to transfer the sound.

Note that, in the embodiments described above, if the obstacle body 45 is omitted, substantially same effect can be obtained. In addition, the above-mentioned structure may be adopted not only to the earpiece 10, but also to a sound radiating hole or the mouthpiece 8 (in this case, a microphone is provided in place of the speaker 41) of a sound radiating device for announcing an arrival of a call or an electronic mail. Also, the above-mentioned structure may be adopted not only to the wireless telephone body 1, but also to the arm band bodies 4 and 5.

FIG. 10 shows a modified example of the wristwatch type wireless telephone described above. The obstacle body 45 is omitted to form a long sound radiating hole 46, with the result that bar-like or needle-like pegs are prevented from entering into the inside of the wireless telephone body 1. Also, the sound radiation hole 46 is made long, with the result that the invasion of water can further be prevented. In addition, by boring the sound radiating hole 46a at a slant, the direction along which the bar-like peg enters, may be regulated, thereby being capable of preventing the peg from contacting with the waterproofing film 43 (shown by a dotted line in the figure).

Besides, as shown in FIG. 11, a projecting portion 47 with a width smaller than the wireless telephone body 1 is formed on top thereof, and a sound radiating hole 48 may provided on the side surface of the projecting portion 47. The obstacle body 45 may be omitted. With taking this structure, in addition to providing the same effect as above, an exit of the sound radiating hole 48 may be disposed at a relatively close position from ear. As a result, it is possible to hear the sound from the earpiece 10 more easily. In addition, as shown in FIG. 12, a lip 49 in the wireless telephone body 1, onto which the waterproofing film 43 is adhered, may be formed so as to extend largely inside thereof. In such a structure, the Lip 49 becomes an obstacle body, with the result that it is capable of preventing the peg from the sound radiating hole from contacting with the waterproof film.

(Embodiment 5)

FIG. 13 shows Embodiment 5 of the wristwatch type wireless telephone in accordance with this invention. The wristwatch type wireless telephone according to this embodiment is characterized in that a second sound radiating hole 51 is provided in the waterproofing structure of the earpiece portion described in Embodiment 4, and the structure other than the above is similar to that in Embodiment 4. Therefore, description of the same structure is omitted. In this wristwatch type wireless telephone, a resonance room 52 is provided to the surface thereof, and speaker holes 54 are formed, too, so as to escape a supporting portion 53 for supporting a driver portion 41a of the speaker 41. Waterproofing films 55 similar to the above are adhered onto those speaker holes 54.

Besides, the second sound radiating hole 51 is provided in the rear surface of the wireless telephone body 1, and the second sound radiating hole 51 is bored with its position shifted from that of the speaker holes 54. Therefore, even if the bar-like or needle-like peg enters from the second sound releasing hole 51, the waterproof film 55 does not suffer from a damage. Further, the dimension of the second sound releasing hole 51 is preferable set as 2 mm or more similar to that of sound radiating hole 44. In addition, a quadrangle or triangle or triangle shape may be employed other than a circle. Note that the second sound radiating hole 51 may be provided on the side surface of the body 1 similar to the sound radiating hole 44 (not shown).

According to this wristwatch type wireless telephone in accordance with Embodiment 5 of the present invention, sound can be output from the back surface of the speaker 41 as well as the front, thereby being capable of increasing the volume of the sound. Besides, in the case where only monitoring is performed without communicating by voice, the sound can be heard from the surface side of the wireless telephone body 1. Note that, it is needless to say that the second sound radiating hole 51 may appropriately be provided in the form of the sound radiating hole 44 in the Embodiment described above.

As described above, in the wristwatch type wireless telephone in accordance with this invention, the sound radiating hole of the mouthpiece and the sound receiving holes of the earpiece are formed in the surface to be the back surface, at the arm side in the state of being worn on an arm by binding with the arm band. Therefore, when the wristwatch type wireless telephone is removed from the arm by one hand, it can be held in the same hand without being shifted from the holding position, and the sound radiating hole of the mouthpiece and the sound receiving holes of the earpiece are thereby positioned on the side opposite from the palm of the hand, so that the sound radiating hole of the mouthpiece and the sound receiving holes of the earpiece correspond to the vicinity of the mouth and the vicinity of the ear. Thus, the wireless telephone of this invention is improved in terms of handling.

Also, in the wristwatch type wireless telephone in accordance with this invention, the display portion and the operating buttons are provided in the surface to be the front side opposite from the arm side in the state of being worn on an arm. Therefore, it is possible to confirm receiving conditions and to perform call operations, i.e., dialing, with improved visibility and operability.

Also, in the wristwatch type wireless telephone in accordance with this invention, the holder portion for detachably holding the body of the wristwatch type wireless telephone is formed in the arm band, and the body of the wristwatch type wireless telephone can be attached or detached from the arm band by a hand operation. Therefore, only the body of the wristwatch type wireless telephone can be removed from the arm band side without removing the arm band from the arm, thereby enabling telephone conversation with improved operability.

Also, in the wristwatch type wireless telephone in accordance with this invention, the shape of the body of the wristwatch type wireless telephone may be deformed between a curved bent shape and a flat shape by the flexible operation of the flexible structure portion, thereby ensuring ease of fitting to the arm band as well as certain compactness when the body of the wristwatch type wireless telephone is carried alone.

Also, in the wristwatch type wireless telephone in accordance with this invention, the sound radiating hole of the mouthpiece and the sound receiving holes of the earpiece are respectively formed in the back surface side of the arm band. The two groups of holes are thereby distanced from each other, so that the sound radiating hole of the mouthpiece is positioned in the vicinity of the mouth and the sound receiving holes of the earpiece are easily positioned in the vicinity of the ear, thereby enabling telephone conversation in a natural position.

Further, in the wristwatch type wireless telephone according to the present invention, the hole boring direction of the sound holes provided in the wristwatch type wireless telephone body and the vertical direction with respect to the face of the waterproofing sheet for preventing the sound devices from exposure to water, which are provided inside the wristwatch type wireless telephone body have such a relationship that they are substantially at right angles at a part or at a whole part thereof, with the result that the sound holes are positioned at other than the portion on the arm side of the body, and therefore the sound holes are hardly clogged with dust and dirt of a hand. Further, even if the peg enters from the sound hole, it does not abut against the waterproofing sheet, thereby being capable of preventing the waterproofing sheet from breaking.

Further in the wristwatch type wireless telephone according to the present invention, by providing the waterproofing sheet for preventing the sound device from water damage, and by providing the sound holes to the wristwatch type wireless telephone body or to the side face of the arm band, the sound holes are hardly clogged with dust and dirt from a user's hand, and even if the peg enters from the sound hole, it can be prevented from breaking the waterproofing sheet.

Further, in the wristwatch type wireless telephone according to the present invention, an obstacle body is provided between the sound hole and a waterproofing sheet, which are provided to the wristwatch type wireless telephone body, with the result that even if the peg enters through the sound holes, the breakage of the waterproofing sheet can be prevented.

Further, in the wristwatch type wireless telephone according to the present invention, a second sound hole is provided to the front side of the wristwatch type telephone body, and the second sound hole and the waterproofing sheet for protecting the sound devices from the water, are arranged while shifting their positions in a plane direction, with the result that, even if the peg enters from the second sound hole, it does not abut against the waterproofing sheet, and therefore the breakage of the waterproofing sheet does not occur. In addition, provision of the second sound hole enables the volume of the sound to be large, and if necessary, it enables sending or receiving conversation from the front side of the body.

What is claimed is:

1. A wristwatch type wireless telephone comprising: a housing having an arm band; and a wireless telephone having a mouthpiece and an earpiece disposed in the housing, the mouthpiece having a sound hole provided in a rear surface of the housing confronting a user's wrist when the wristwatch type wireless telephone is worn on the user's wrist, and the earpiece having a sound hole provided in the rear surface of the housing; wherein the housing comprises a holder portion attached to the arm band and having a recess in which a body of the wireless telephone is removably disposed so that the wireless telephone body can be inserted and removed from the recess by a one-hand operation, the sound hole of the mouthpiece and the sound hole of the earpiece are provided in a rear surface of the wireless telephone body facing the user's wrist when the wristwatch type wireless telephone is worn on the user's wrist, and the body of the wireless telephone has a flexible structure at an intermediate portion thereof to enable the body to be deformed between a curved shape and a flat shape by bending the flexible structure.

2. A wristwatch type wireless telephone according to claim 1; further comprising a display portion provided in a front surface of the body of the wireless telephone opposing the user's arm when the wristwatch type wireless telephone is worn on the user's wrist; and operating buttons for controlling the wireless telephone device provided in the front surface of the body of the wireless telephone.

3. A wristwatch type wireless telephone comprising: a housing having an arm band; a wireless telephone having a mouthpiece and an earpiece disposed in the housing, the mouthpiece having a sound hole provided in a rear surface of the housing confronting a user's wrist when the wristwatch type wireless telephone is worn on the user's wrist, and the earpiece having a sound hole provided in the rear surface of the housing; and a waterproof sheet covering a portion of at least one of the mouthpiece and the earpiece; wherein hole boring directions of the sound hole of the mouthpiece and the sound hole of the earpiece, and a vertical direction with respect to a face of the waterproof sheet, are substantially at right angles with each other.

4. A wristwatch type wireless telephone comprising: a housing having an arm band; a wireless telephone having a mouthpiece and an earpiece disposed in the housing; and a waterproof sheet covering a portion of at least one of the mouthpiece and the earpiece; wherein sound holes of the mouthpiece and the earpiece are formed in the housing directly in front of the waterproof sheet and have hole boring directions oriented so that an object extended therethrough does not come in contact with the waterproof sheet.

5. A wristwatch type wireless telephone according to claim 1; further comprising a waterproof sheet covering a portion of at least one of the mouthpiece and the earpiece, and an obstacle body provided between a sound hole and the waterproof sheet.

6. A wristwatch type wireless telephone according to claim 3; further comprising a second sound hole formed in a front surface of the body of the wireless telephone opposite the rear surface; and a second waterproof sheet provided in the body of the wireless telephone between the second sound hole and one of the mouthpiece and the earpiece; wherein the second sound hole and the second waterproof sheet are shifted in position so that an object extended through the second sound hole does not come into contact with the second waterproof sheet.

7. A wristwatch type wireless telephone according to claim 4; further comprising a second sound hole formed in a front surface of the housing opposite the surface confronting the user's wrist when the wristwatch type wireless telephone is worn on the user's wrist; and a second waterproof sheet provided in the housing between the second sound hole and at least one of the mouthpiece and the earpiece; wherein the second sound hole and the second waterproof sheet are shifted in position so that an object extended through the second sound hole does not come into contact with the second waterproof sheet.

8. A wristwatch type wireless telephone according to claim 5; further comprising a second sound hole formed in a front surface of the body of the wireless telephone opposite the rear surface; and a second waterproof sheet provided in the body of the wireless telephone between the second sound hole and at least one of the mouthpiece and the earpiece; wherein the second sound hole and the second waterproof sheet are shifted in position so that an object extended through the second sound hole does not come into contact with the second waterproof sheet.

9. A wristwatch type wireless telephone according to claim 1; wherein the arm band has a pair of substantially C-shaped strap members connected at first ends to opposite sides a body of the wireless telephone.

10. A wristwatch type wireless telephone according to claim 2; wherein the operating buttons are connected to the wireless telephone to control dialing of a telephone number.

11. A wristwatch type wireless telephone according to claim 1; further comprising a waterproof layer disposed between a sound hole and at least one of the mouthpiece and the earpiece; wherein the sound hole extends in a direction perpendicular from a plane of the waterproof layer so that an object passed into the sound hole does not damage the waterproof layer.

12. A wrist-wearable communication device comprising: a housing having a wrist band; a communication device disposed in the housing and having a mouthpiece and an earpiece each having sound holes formed in a side surface of the housing that does not confront a user's wrist when the communication device is worn on the user's wrist; and a waterproof sheet covering a portion of at least one of the mouthpiece and the earpiece; wherein the sound holes of the mouthpiece and the earpiece are oriented so that an object extended therethrough does not come in contact with the waterproof sheet.

13. A wrist-wearable communication device according to claim 12; wherein the communication device comprises a wireless telephone.

14. A wrist-wearable communication device according to claim 12; further comprising a display, and operating buttons for controlling the communication device provided in a front surface of the housing that does not confront a user's wrist when the communication device is worn on the user's wrist.

15. A wrist-wearable communication device according to claim 12; wherein the housing comprises a holder portion for detachably holding a body of the communication device, the arm band is attached to the holder portion, and the sound holes of the mouthpiece and the earpiece are provided in a side surface of the body that does not face the user's wrist when the communication device is worn on the user's wrist.

16. A wrist-wearable communication device according to claim 15; wherein the holder portion and body are configured so that the body can be removed from the holder portion in a one-hand operation.

17. A wrist-wearable communication device according to claim 15; wherein the body has a flexible structure at an intermediate portion thereof to enable the body to be deformed between a curved shape and a flat shape.

18. A wrist-wearable communication device according to claim 12; further comprising an obstacle member provided between the respective sound holes and the waterproof sheet.

19. A wristwatch type wireless telephone according to claim 1; wherein the mouthpiece and the earpiece each comprise a sound converting device provided in the wireless telephone body, a resonance space provided between the sound converting device and the sound hole, and a waterproof sheet mounted between the sound converting device and the resonance space.

20. A wristwatch type wireless telephone according to claim 19; wherein the mouthpiece and the earpiece each further comprises a second sound hole provided at a front surface of the wireless telephone body opposite the rear surface, and a second waterproof sheet provided between the sound converting device and the second sound hole.

21. A wristwatch type wireless telephone according to claim 20; wherein the sound converting device of each of the mouthpiece and the earpiece is mounted to a lip formed in the wireless telephone body, and the second waterproof sheet covers a hole formed in the lip for projecting sound between the second sound hole and the sound converting device.

22. A wristwatch type wireless telephone according to claim 21; wherein a position of the second waterproof sheet is shifted from that of the second sound hole so that an object inserted into the second sound hole does not come into contact with the second waterproof sheet.

23. A wristwatch type wireless telephone according to claim 4; wherein the mouthpiece and the earpiece each comprise a sound converting device provided in the housing, a resonance space provided between the sound converting device and the sound hole, and the waterproof sheet, the waterproof sheet being mounted between the sound converting device and the resonance space.

24. A wristwatch type wireless telephone according to claim 23; wherein the mouthpiece and the earpiece each further comprises a second sound hole provided in the housing, and a second waterproof sheet provided between the sound converting device and the second sound hole.

25. A wristwatch type wireless telephone according to claim 24; wherein the sound converting device of each of the mouthpiece and the earpiece is mounted to a lip formed in the housing, and the second waterproof sheet covers a hole formed in the lip for projecting sound between the second sound hole and the sound converting device.

26. A wristwatch type wireless telephone according to claim 25; wherein a position of the second waterproof sheet is shifted from that of the second sound hole so that an object inserted into the second sound hole does not come into contact with the second waterproof sheet.

27. A wrist-wearable communication device according to claim 12; wherein the mouthpiece and the earpiece each comprise a sound converting device provided in the housing, a resonance space provided between the sound converting device and the sound hole, and the waterproof sheet, the waterproof sheet being mounted between the sound converting device and the resonance space.

28. A wrist-wearable communication device according to claim 27; wherein each of the mouthpiece and the earpiece further comprises a second sound hole provided in the housing, and a second waterproof sheet provided between the sound converting device and the second sound hole.

29. A wrist-wearable communication device according to claim 28; wherein the sound converting device of each of the mouthpiece and the earpiece is mounted to a lip formed in the housing, and the second waterproof sheet covers a hole formed in the lip for projecting sound between the second sound hole and the sound converting device.

30. A wrist-wearable communication device according to claim 29; wherein a position of the second waterproof sheet is shifted from that of the second sound hole so that an object inserted into the second sound hole does not come into contact with the second waterproof sheet.

* * * * *